United States Patent [19]

Dale

[11] 4,406,706

[45] Sep. 27, 1983

[54] YELLOW COLORANT COMPOSITION AND PAINTS UTILIZING THE SAME

[75] Inventor: John M. Dale, San Antonio, Tex.

[73] Assignee: Southwest Research Institute, San Antonio, Tex.

[21] Appl. No.: 359,479

[22] Filed: Mar. 18, 1982

[51] Int. Cl.$^3$ ............................................... C09D 5/00
[52] U.S. Cl. ................................. 106/288 B; 106/19; 106/288 Q
[58] Field of Search ................. 106/19, 288 B, 288 Q, 106/287.32; 501/140

[56] References Cited

U.S. PATENT DOCUMENTS 1,730,178 10/1929 Van Cuyck ............................ 106/19
3,316,115 4/1967 Barnes et al. ........................ 106/287
3,421,911 1/1969 Greco et al. .......................... 106/19

*Primary Examiner*—James Poer
*Attorney, Agent, or Firm*—Sigalos & Levine

[57] ABSTRACT

A yellow colorant composition comprising elemental sulfur having associated intimately therewith a yellow coloring substance and the resulting paint comprising a paint base and said colorant composition.

12 Claims, No Drawings

YELLOW COLORANT COMPOSITION AND PAINTS UTILIZING THE SAME

BACKGROUND OF THE INVENTION

At the present time large amounts of paint are used for yellow traffic marking purposes on highways, parking lots, and the like areas. At present, lead chromate pigment is used to impart the yellow color to such paint and it is stated that some 48 million pounds of lead chromate pigment are used annually to pigment such paint; approximately two pounds of lead chromate pigment per gallon. While excellent from a color point of view, lead chromate is not completely desirable in that it is toxic and also in that it is costly. Consequently, there have been efforts to try to utilize other colorant materials; i.e., pigments and dyes, for yellow traffic marking paint purposes.

These efforts, however, have not been successful to produce a low cost and nontoxic yellow colorant. Either the cost is higher than the lead chromate, the materials are toxic, they fail to give the desired yellow color, and/or they fail to have adequate light-fastness in service. At the present time, government agencies, such as the Federal Highway Administration and state, county, and municipal highway and related agencies, use standards based on the "Highway Yellow Color Tolerance Chart" of the Federal Highway Administration of the U.S. Department of Transportation for yellow traffic marking paints on highways, roads, streets, and the like, and some colorants which are ostensibly low cost and nontoxic fail to meet such standards in the term of color.

SUMMARY OF THE INVENTION

The present invention overcomes the problems of the prior art and provides a low cost, nontoxic yellow colorant composition.

Briefly stated, the present invention comprises a yellow colorant composition comprising elemental sulfur having associated intimately therewith a yellow coloring substance. The invention also comprises a paint comprising a paint base and said yellow colorant composition.

DETAILED DESCRIPTION

The two essential components of the colorant composition of the present invention are elemental sulfur and a yellow coloring substance. As used herein, the term "coloring substance" is meant to include pigments, dyes, or any other materials that will impart the desired color.

With respect to the elemental sulfur, it should be a commercial grade commonly referred to a "Standard Bright". It is preferred to use sulfur of fine particle size; most preferably having an average particle size of 1 micron or below; no greater than about 1 micron. Such fine particle size can be obtained either by grinding of the solid sulfur or by spraying molten sulfur into water, oil, or other fluid, in which the sulfur, upon cooling, solidifies into extremely fine particles. Such fine particle size sulfur is produced by such spraying technology by and is available from Stoller Chemical Company under the name Microsul.

With respect to the yellow coloring substance, it is preferred to use a pigment; preferably an inorganic pigment. Dyes, while suitable are not as light-fast when exposed to the elements. Examples of suitable pigments are Hansa yellow, Dalamar yellow, Segnale yellow, Benzadine yellow, Irgazin yellow, Fanchon yellow, and Sunglow yellow. A suitable dye is Oil soluble yellow. It is more suitable if the pigment is also soluble or easily dispersible in sulfur.

As to proportions, the yellow colorant composition contains, for each 100 parts by weight thereof, from about 95 to 99.5 parts by weight of elemental sulfur and, correspondingly, 5 to 0.5 parts by weight of the yellow coloring substance distributed substantially uniformly throughout the composition. The precise proportions will vary depending upon the particular yellow coloring substance used in order to obtain a final composition which, when added to a paint base as a substitute for lead chromate to form a paint, will give the desired yellow color.

In forming the composition, it is important that the coloring substance be intimately associated with the sulfur; i.e., dissolved therein, dispersed therein, adhered thereto, or otherwise physically uniformly associated with the sulfur. This can be accomplished in a variety of ways. The coloring substance can be introduced into molten sulfur and thoroughly admixed therewith to substantially uniformly distribute the coloring substance throughout the sulfur. This mixture is allowed to solidify and then ground to a fine particle size. Alternatively, the coloring material is mixed with the molten sulfur prior to being sprayed into a fluid (water, an oil, or other fluid suitable for use in paint) to form, upon cooling, the fine particle size solids, as described above in the manufacture of Microsul.

The resultant colorant composition, when formed, either in the form of a dry powder or dispersion in water, an oil, or other fluid can be used in making a paint in a conventional manner. That is to say, it can be added to any suitable paint base suitable for making a yellow marking paint. As used herein, the term "paint base" means the usual components found in such paints other than the coloring material; i.e., components such as the resin vehicle, solvent, plasticizers, antiskinning agents, driers, binders, extenders, and the like. It is obvious that one should not use any specific component which adversely reacts with sulfur.

The colorant composition is suitably admixed with the paint base as a substitute for the lead chromate in proportions necessary to give the proper color and hiding power on use. The refractive index of lead chromate is 2.31, as compared to 2 for sulfur; and, therefore, slightly more of this composition may be required, depending upon the other components of the paint, to give the same hiding power as lead chromate. It is, of course, understood, that the paint will contain the other usual and conventional components; as discussed above, in their usual amounts and for their conventional purposes.

The invention will be further illustrated in conjunction with the following examples, which are set forth for purposes of illustration only and not by way of limitation. The formulations set forth thereinaare the Texas Highway Department Paint Specifications for yellow paint (Example 1) and yellow binder, bead (Example 2) in which the yellow colorant composition is substituted on an equal weight basis for the lead chromate of the Specifications and the lead drier of the Specifications is omitted.

EXAMPLE 1

A yellow marking paint is prepared having the following formulation:

| | Pounds/100 gallons |
|---|---|
| Yellow Colorant Composition* | 200 |
| TiO$_2$, Anatase, FF, DuPont | 10 |
| Lithopone, Permalith, Sherwin-Williams | 150 |
| Talc, Nytal #300, Vanderbilt | 300 |
| Bentone 38, National Lead | 2 |
| Traffic Alkyd, 50% Solids | 475 |
| 6% Cobalt Drier | 3 |
| Anti-Skinning Agent, Exkin #2 | 2 |
| Butyl Alcohol | 2 |
| VM & P Naphtha | 85 |
| | 1229 |

*A particulate composition of 95% by weight of elemental sulfur and 5% by weight of Hansa yellow formed by introducing the Hansa yellow into the molten sulfur and the mixture sprayed into water, the resultant fine particles of the composition are separated from the water and dried prior to use.

EXAMPLE 2

A yellow binder, bead product is formed utilizing the following formulation:

| | Pounds |
|---|---|
| Yellow colorant composition of Example 1 | 500 |
| 70% Long Oil Alkyd Resin | 670 |
| Zinc Resinate, Zinol, Newport | 30 |
| 6% Cobalt Drier | 3 |
| Pine Oil | 6 |
| | 1209 |
| Bead Binder Thinner | |
| Methyl Isobutyl Ketone | 50 |
| Mineral Spirits | 50 |
| | 100 |

It is contemplated that the yellow paint of Example 1 and the yellow binder, bead of Example 2 will function as equivalent substitutes for the compositions which use lead chromate as the pigment and a lead drier.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A yellow colorant composition consisting essentially of elemental sulfur having associated intimately therewith a yellow coloring substance.

2. The composition of claim 1 wherein said coloring substance is an inorganic yellow pigment.

3. The composition of claims 1 or 2 wherein said composition is particulate and having a very fine average particle size.

4. The colorant composition of claims 1 or 2 wherein for each 100 parts by weight of said composition there is utilized from 95 to 99.5 parts by weight of elemental sulfur.

5. The colorant composition of claims 1 or 2 wherein the colorant composition is dispersed in a fluid selected from water or an oil.

6. A yellow colorant composition consisting essentially of, for each 100 parts by weight, 95 to 99.5 parts by weight of a particulate elemental sulfur and associated intimately therewith, correspondingly, .5 to 0.5 parts by weight of an inorganic yellow pigment.

7. The yellow colorant composition of claim 6 wherein the average particle size of said elemental sulfur is about 1 micron or below.

8. A paint comprising a paint base and the yellow colorant composition of claim 1.

9. The paint of claim 8 wherein the coloring substance is an inorganic yellow pigment and the elemental sulfur has an average particle size no greater than about 1 micron.

10. The paint of claims 8 or 9 wherein for each 100 parts by weight of said colorant composition there is utilized from about 95 to 99.5 parts by weight of elemental sulfur.

11. A yellow traffic marking paint consisting essentially of a paint base and a yellow colorant composition consisting essentially of, for each 100 parts by weight of said composition, 95 to 99.5 parts by weight of elemental sulfur and, correspondingly, 5 to 0.5 parts by weight of an inorganic yellow pigment.

12. The yellow traffic marking paint of claim 11 wherein the average particle size of said composition is no greater than about 1 micron and the proportion of yellow colorant composition in said paint is sufficient to give the paint upon application a color which meets applicable color standards.

* * * * *